United States Patent [19]

Hoenig

[11] Patent Number: 5,336,520
[45] Date of Patent: Aug. 9, 1994

[54] HIGH DENSITY-HIGH PURITY GRAPHITE PREPARED BY HOT ISOSTATIC PRESSING IN REFRACTORY METAL CONTAINERS

[75] Inventor: Clarence L. Hoenig, Livermore, Calif.

[73] Assignee: The United States of America as represented by the United States Department of Energy, Washington, D.C.

[21] Appl. No.: 539,270

[22] Filed: Jun. 18, 1990

[51] Int. Cl.$^5$ ............................................. C01B 31/04
[52] U.S. Cl. ..................... 427/154; 423/448; 264/102; 264/125; 264/325
[58] Field of Search ............ 423/460, 448, 440; 264/570, 102, 125, 325; 427/154

[56] References Cited

U.S. PATENT DOCUMENTS

| | | | |
|---|---|---|---|
| 3,182,102 | 5/1965 | Simnad | 423/448 |
| 4,092,384 | 5/1978 | Hrovat | 252/639 |
| 4,094,897 | 6/1978 | Nagasawa et al. | 423/448 |
| 4,134,451 | 1/1979 | Conant et al. | 427/250 |
| 4,692,288 | 9/1987 | Rossmann et al. | 264/62 |
| 4,799,957 | 1/1989 | Vogel | 419/49 |
| 4,855,103 | 8/1989 | Ekbom | 419/49 |
| 4,983,339 | 1/1991 | Boncoeur et al. | 264/56 |

FOREIGN PATENT DOCUMENTS 584052 12/1977 U.S.S.R. ................ 423/440

OTHER PUBLICATIONS

Hoenig et al., "Densification studies of Refractory Materials Using H/P and Tantalum Containment" Apr. 27, 1990 Livermore Nat'l Lab.

Primary Examiner—Wayne Langel
Assistant Examiner—Stuart L. Hendrickson
Attorney, Agent, or Firm—Henry P. Sartorio; Roger S. Gaither; William R. Moser

[57] ABSTRACT

Porous graphite in solid form is hot isostatically pressed in a refractory metal container to produce a solid graphite monolith with a bulk density greater than or equal to 2.10 g/cc. The refractory metal container is formed of tantalum, niobium, tungsten, molybdenum or alloys thereof in the form of a canister or alternatively plasma sprayed, chemically vapor deposited, or coated by some other suitable means onto graphite. Hot isostatic pressing at 2200° C. and 30 KSI (206.8 MPa) argon pressure for two hours produces a bulk density of 2.10 g/cc. Complex shapes can be made.

8 Claims, 1 Drawing Sheet

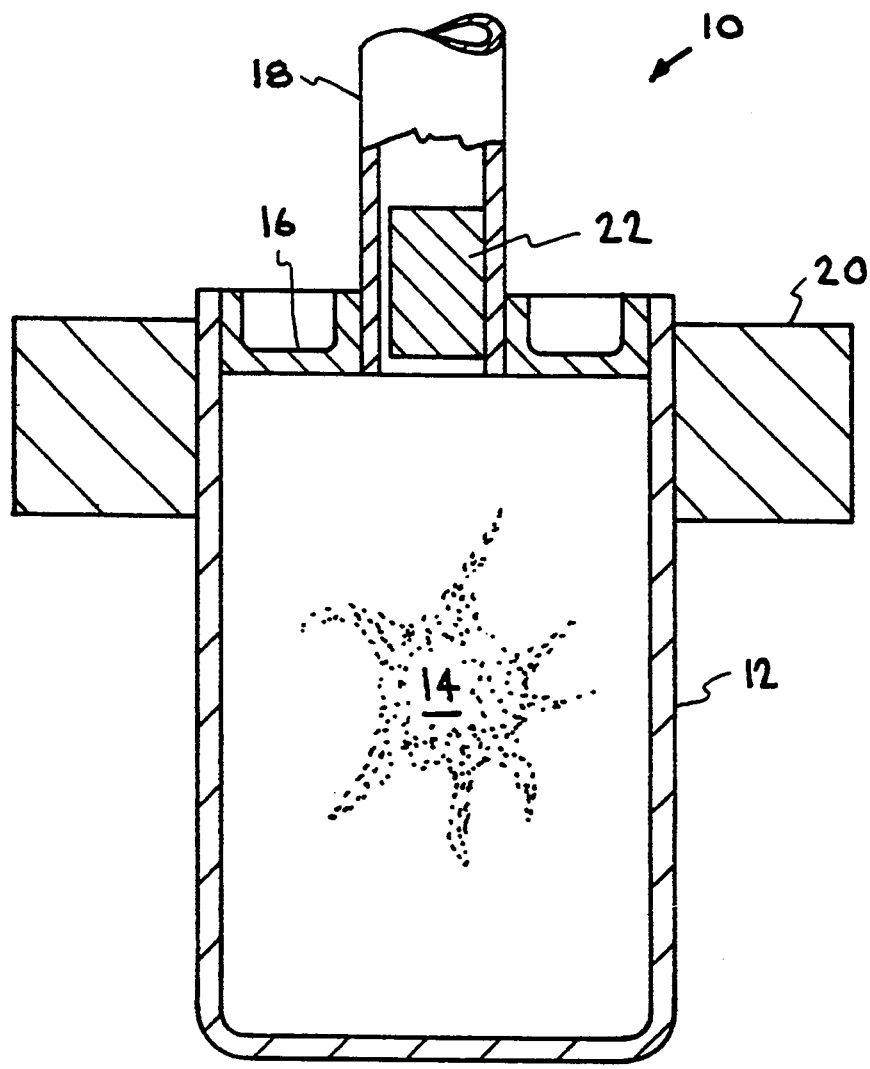

HIGH DENSITY-HIGH PURITY GRAPHITE PREPARED BY HOT ISOSTATIC PRESSING IN REFRACTORY METAL CONTAINERS

BACKGROUND OF THE INVENTION

The United States Government has rights in this invention pursuant to Contract No. W-7405-ENG-48 between the U.S. Department of Energy and the University of California for the operation of Lawrence Livermore National Laboratory, The invention relates generally to fabrication of high density refractory materials and more particularly to the fabrication of high density crystalline graphite by hot isostatic pressing.

Graphite is an extremely useful material for a number of applications,

Polycrystalline commercial graphite has characteristics similar to both metals and ceramics, Because of its crystalline behavior and method of fabrication, graphite properties are anisotropic and directional in nature.

Like ceramics, graphite is a refractory material that is thermodynamically stable at high temperatures. Graphite's strength at high temperature is unequalled by any other known material. This, coupled with its low density, gives graphite a very high specific strength. It does have low oxidation resistance in air at elevated temperatures.

Like metals, it has very good thermal and electrical characteristics. It has approximately one-third the thermal conductivity of copper. It is considered to be an electrical conductor, but its resistivity is much greater than that of copper. The density of commercial graphite is seldom greater than of theoretical (2.26 g/cc). The nature of residual porosity (size, distribution and uniformity) can have important effects on the properties of graphite.

Some of the many applications of graphite include optoelectronics; high temperature seals, bushings, piston rings, and valve seats; hot pressing dies and punches; biomedical implants; electric discharge machining; high energy physics; aircraft and space.

Most commercial graphites are fabricated in a multi-step process. Constituents are mixed and then consolidated and shaped by molding or extruding using pressure. This step is followed by heat treatment in a non-oxidizing atmosphere to approximately 1000° C. to purge volatile constituents and form amorphous carbon. Finally, the material is transformed to porous graphite by additional heat treatment to temperatures in the range of 2500°–3000° C. In some cases, pressure is also applied in the final step. Graphites produced with pressure are called "Hot Worked" or "Recrystallized". However, all of these commercial graphite products still have significant residual porosity and bulk densities less than 84% of theoretical.

Graphite with higher density and also with isotropically uniform properties is desired. The ability to produce complex shapes is also desired.

SUMMARY OF THE INVENTION

Accordingly it is an object of the invention to provide a method for forming high density graphite with isotropically uniform properties.

It is another object of the invention to provide a method of forming crystalline graphite with a density greater than 1.9 g/cc and more preferably greater than 2.1 g/cc.

It is a further object of the invention to provide high density crystalline graphite monoliths.

It is another object of the invention to provide crystalline graphite with a density of at least 1.9 g/cc and more preferably of at least 2.1 g/cc.

It is also an object of the invention to form high density graphite into complex shapes with isotropically uniform microstructure.

The invention is a method of forming high density, high purity crystalline graphite with isotropically uniform microstructure (uniform in all directions) by hot isostatic pressing in refractory metal containers. The refractory metal containers are preferably formed of tantalum, niobium, tungsten, molybdenum or alloys of these metals. Commercially available graphite with bulk densities less than 84% theoretical is hot isostatically pressed at up to 2200° C., and up to 30 KSI (206.8 MPa) argon pressure for up to eight hours. A hermetically sealed refractory metal canister is utilized; the starting material may be a pressed or sintered graphite powder compact, or else graphite prowder. Alternatively the container is formed by Plasma Spraying (PS), Chemical Vapor Deposition (CVD), or some other suitable coating process of the refractory metal on a porous graphite body or powder compact.

The invention also includes the resulting product, hot-isostatically-pressed crystalline graphite having a density of at least 1.9 g/cc (84% of theoretical) and more preferably at least about 2.10 g/cc (93% of theoretical) and an isotropically uniform microstructure (directionally uniform).

BRIEF DESCRIPTION OF THE DRAWINGS

In the accompanying drawings:

The FIGURE is a sectional view of a HIP can assembly.

DETAILED DESCRIPTION OF THE PREFERRED EMBODIMENTS

The invention is a method for forming high density crystalline graphite and the resulting high density crystalline graphite product formed thereby. Commercially available porous graphite in solid form is used as the starting material. The graphite is machined and placed in a hermetically sealed container made of a refractory metal selected from tantalum, niobium, tungsten, molybdenum and alloys thereof. Alternatively, commercially available graphite powder may be used, either at tap density, or prepressed or sintered to form a porous body; hot pressing may be used to prepress the graphite. The container loaded with graphite is then heated and evacuated (subject to vacuum) to remove any residual water vapor and other gas in order to enhance final densification. The container is then hermetically sealed and leak checked. The sealed container is hot isostatically pressed (HIP) at suitable temperature and pressure for a suitable time interval. In a preferred embodiment of the process the graphite in a tantalum container is HIPed at 2200° C. and 30 KSI (206.8 MPa) argon pressure for up to eight hours. After HIP densification the graphite product is removed from the container, e.g. by machining away the container or etching or other suitable process. The container material can be salvaged and reprocessed.

In accordance with the invention a refractory canister can be utilized as the container. This type container can be evacuated prior to HIPing to improve densification. As shown in the FIGURE guergure, a HIP can assembly 10 is made up of a tantalum or other refractory metal container 12 which is filled with graphite 14. A tantalum or other refractory metal lid 16 which has a tantalum or other refractory metal pump out tube 18 attached thereto is welded to the top of the graphite filled container 12. A copper chill block 20 can be attached around the top of container 12 to act as a heat sink when lid 16 is welded to container 12. A tantalum or other refractory metal support cylinder 22 is placed in tube 18 at the attachment junction to lid 16. Cylinder 22 is a metal rod of diameter less than the diameter of tube 18 to allow the interior of container 12 to be pumped out before sealing but to protect the lid 16 tube 18 attachment joint from total collapse during the HIP process. Container 12 is sealed by pinching off tube 18 above cylinder 22. A typical container is cylindrical, with an outer diameter of 1.5 inches, a height of 2 inches and a wall thickness of 0.062 inches (or about 3.8 cm $\times$ 5.1 cm $\times$ 1.6 mm).

However, this type canister can exhibit some mechanical disadvantages such as seams, welded joints and the like. An alternative container can be formed by either plasma spraying, chemical vapor deposition or any other suitable coating process, of the refractory metal directly onto a preformed or prepressed porous graphite body.

Although a typical canister or container will be cylindrical in shape, the invention can be practiced with different shaped containers. The HIP process is well suited to complex shapes. A noncylindrical canister can be loaded with graphite, or a graphite body of complex shape can be coated with refractory metals.

The HIP process can be carried out over a wide range of temperature, pressure and time parameters to produce a graphite product with desired characteristics. A Model QIH 33 Hot Isostatic Pressing System (ABB Autoclave Systems, Inc., 3721 Corporate Drive, Columbus, Ohio 43229) capable of 2200° C. temperature and 30 KSI (206.8 MPa) pressure was used. A detailed illustrative processing sequence is as follows:

Step 1: After leak checking, the hermetically sealed container is placed into the HIP furnace chamber.

Step 2: The HIP chamber is evacuated and back filled with pure Argon gas at 300° C. (A pure inert atmosphere is used to prevent container and furnace oxidation).

Step 3: The temperature and pressue are then increased to up to 2200° C. and up to 30 KSI (206.8 MPa) at any suitable rate. A typical HIP furnace specification permits heating at 1000° C./hour. Experimentally, a rate of 950° C./hour was used.

Step 4: Hold at up to 1800° C. and up to 30 KSI (206.8 MPa) for 1-8 hours.

Step 5: Cool to room temperature and one atmosphere pressure at any suitable rate . A typical HIP furnace specification permits cooling at 1000° C./hour. Experimentally a rate of 475° C./hour was used.

Step 6: Open HIP furnace, retrieve HIP canister and remove graphite.

Experimentally, the density of high purity hot pressed graphite (from Poco Graphite Inc.) was increased by 15% from 1.83 g/cc to 2.10 g/cc by HIP processing in accordance with the invention at 2200° C./206.8 MPa/2 hrs. Longer hold times should yield even higher density.

In accordance with the invention a graphite product with a measured bulk density of 2.10 g/cc was obtained, a material with 93% of theoretical density (2.26 g/cc). Depending on HIP conditions, graphite material with bulk density of at least 1.90 g/cc (84% theoretical density), and more preferably at least 2.10 g/cc (93% theoretical density) can be produced. Because an isostatic process is used, the material will have an isotropically uniform microstructure. Complex shapes are relatively easy to densify.

Changes and modifications in the specifically described embodiments can be carried out without departing from the scope of the invention which is intended to be limited only by the scope of the appended claims.

I claim:

1. A method of making high density crystalline graphite comprising:

providing graphite starting material consisting essentially of graphite selected from graphite powder and a preformed porous graphite body in a sealed refractory metal container formed of tantalum, niobium, tungsten, molybdenum or alloys thereof having a wall thickness of about 1.6 mm;

hot isostatically pressing the sealed refractory container filled with the graphite starting material at about 1800° C. up to about 2200° C. and at up to about 30 KSI (206.8 MPa) for about two to eight hours.

2. The method of claim 1 wherein the container has a noncylindrical shape.

3. The method of claim 1 further comprising:

evacuating the refractory method container filled with graphite starting material and hermetically sealing the container prior to hot isostatically pressing.

4. The method of claim 1 further comprising:

removing the refractory metal container after hot isostatically pressing.

5. A method of making high density crystalline graphite comprising:

providing a preformed porous graphite body;

forming a coating of tantalum, niobium, tungsten, molybdenum or alloys thereof on the preformed porous graphite body to form a sealed container therearound;

hot isostatically pressing the sealed refractory container around the graphite body at about 1800° C. up to about 2200° C. and at up to about 30 KSA (206.8 MPa).

6. The method of claim 5 wherein the coating is formed by plasma spraying or chemical vapor deposition.

7. The method of claim 5 wherein the step of hot isostatically pressing is performed for up to about eight hours.

8. The method of claim 5 further comprising forming the graphite body with a noncylindrical shape.

* * * * *